No. 671,010. Patented Apr. 2, 1901.
E. CANNIFF.
STUBBLE BURNING MACHINE.
(Application filed June 2, 1900.)

(No Model.)

Witnesses

Inventor:
Edgar Canniff

By
Attorneys

UNITED STATES PATENT OFFICE.

EDGAR CANNIFF, OF WINNIPEG, CANADA.

STUBBLE-BURNING MACHINE.

SPECIFICATION forming part of Letters Patent No. 671,010, dated April 2, 1901.

Application filed June 2, 1900. Serial No. 18,892. (No model.)

*To all whom it may concern:*

Be it known that I, EDGAR CANNIFF, a subject of the Queen of Great Britain, residing at Winnipeg, in the Province of Manitoba and Dominion of Canada, have invented a new and useful Stubble-Burning Machine, of which the following is a specification.

My invention relates to stubble-burning machines, and has for its object to produce a device of this kind by means of which straw may be utilized as fuel and the stubble of a field can be quickly burned over, so as to convert the stubble into the most available plant-food and avoid the delay and loss of moisture in rotting the same when turned under by the plow. Experience has shown that in the great wheat-raising regions of the Northwest there is but a minimum rainfall from the time the seed is sown until after it has grown to such an extent as to commence stooling or increasing the number of stalks for each grain of wheat. If the stubble of the previous crop should be turned under, it will absorb more or less of the moisture in the ground, and thereby decrease the available amount of moisture to that extent for the growing crop. In addition to this a great many of the stalks project above the surface of the ground, and thereby form passages for the air to the points at greater or less depth, which rapidly evaporate and carry away additional moisture. Under these conditions the growing crop is often retarded or damaged to a considerable extent. On the other hand, it has been found that if the stubble were consumed before being turned under the resulting ash will act as a fertilizer and will improve the condition of the soil, thereby tending to increase the yield of the succeeding crop.

I have found that by depositing a small amount of straw upon the stubble and setting fire to it and then covering the fire with a movable protector or shield the shield can be drawn across the field quickly and effectively burn the stubble, a small additional amount of straw being scattered in front of the shield to take the place of that which is consumed.
My invention consists in the improved construction and novel arrangement of parts of such a shield or burner, as will be hereinafter more fully set forth.

Figure 1:
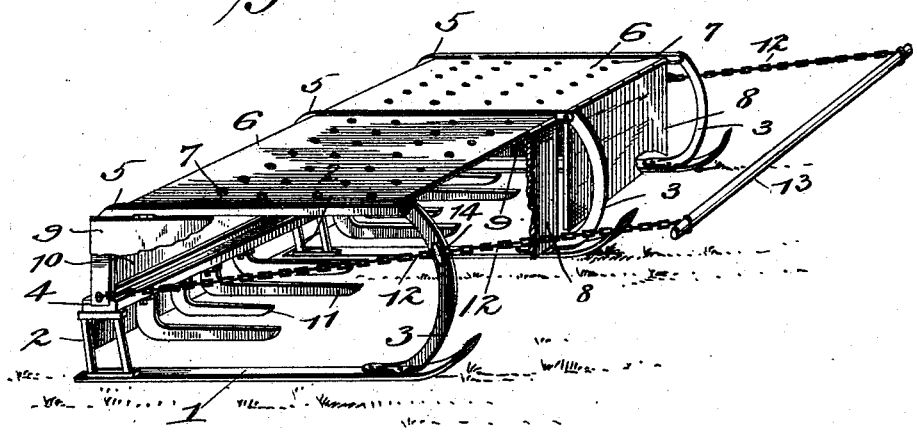
Figure 2:
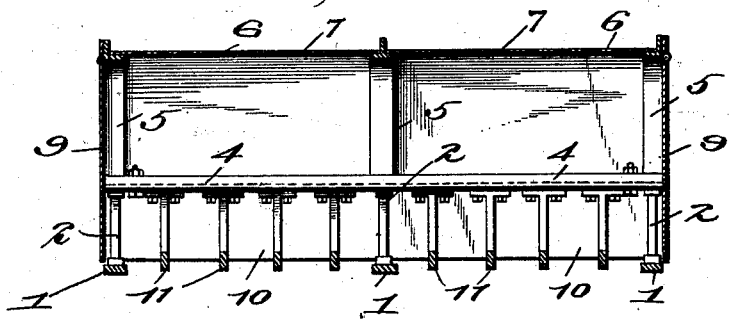
Figure 3:
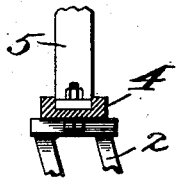

In the accompanying drawings, in which the same reference-numerals indicate corresponding parts in each of the views in which they occur, Figure 1 is a perspective view of my improved burner or shield. Fig. 2 is a longitudinal sectional view of the same, and Fig. 3 is a detail view.

Referring more particularly to the drawings, 1 indicates the shoes or runners of my improved burner, which may be of any suitable length and are preferably formed from steel. One of the runners is located at each end of the machine and the intermediate portion is provided with a sufficient number to properly support it, one runner being shown in the drawings. Secured at the opposite ends of said runners are the standard 2 and legs 3, the standards being preferably inclined to the rear and the legs being slightly curved forward. The cross-piece 4 is secured to the standards and is preferably formed from channeled iron, with the flat surface downward. Rigidly secured within the channel by means or bolts or otherwise directly over each of the standards is the rear end of a curved frame 5, the forward end of which is suitably secured to the upper end of the corresponding legs.

A flat sheet-metal top 6 is secured to the frames in any suitable manner to form a cover for the burner. Suitable openings 7 are formed throughout the cover to assist in the combustion or burning of the straw and stubble as the machine moves forward. Aprons 8 are secured in front of the machine, preferably by means of pivots or hinges, and other aprons 9 and 10 may be secured at the ends and to the rear. The lower edges of these aprons extend down nearly to the ground, sufficient space being left for the entrance of air to support the combustion of the straw and stubble.

Rigidly secured to the under side of the cross-piece 4 are a series of forwardly-extending prongs or forks 11, the rear ends of which are curved to such an extent as to permit of the front ends lying so near the ground as to engage with the straw and carry it forward as the machine advances, thereby permitting of the straw being thoroughly consumed and of causing the combustion of the stubble over which it passes. I prefer to construct these forks or fingers of different lengths and have their forward ends slightly curved or rounded upon the under surface, so as to readily slip over obstructions instead of engaging therewith.

Secured to the rear portion of the machine at each end, preferably at the ends of the cross-piece 4, is a chain 12, the front ends of which are joined together by means of a bar or rod 13. The intermediate portion of each chain is secured to the front legs by means of a loop 14.

As above described, my improved straw-burner is secured at the rear of an ordinary farm-wagon and is drawn back and forth across the field as the wagon advances. A desirable amount of straw is placed upon the wagon, which is gradually thrown off in front of the advancing burner. Before the machine is started the straw which is thrown in front of it is lighted, and after it gets to burning sufficiently the machine is moved forward and passes over the burning straw and picks it up and carries it forward. The additional straw that is thrown from the wagon gradually passes under the burner and is fired by the burning straw therein, and in turn it sets fire to the additional straw, the aprons in front swinging upon their pivots to permit of the entrance of the unconsumed straw. The intense heat generated within the burner will rapidly consume any stubble that may be upon the ground, and it will also destroy all seeds of weeds and obnoxious plants, thereby preventing their germination and growth with the succeeding crop of wheat. With a heavy stubble and a sufficient wind it is only necessary to pass the burner across the field at suitable distances apart, as the fire will travel from one burned path to the other. By making the machine of sufficient width it will be seen that a large area of ground may be quickly passed over, thereby enabling the farmer to remove the stubble in a very expeditious and satisfactory manner.

Although I have shown what I consider the most desirable form of constructing my improved stubble-burner, yet I reserve the right to make such changes and alterations therein as will come within the scope of my invention.

Having thus fully described my invention, what I claim as new, and desire to secure by Letters Patent of the United States, is—

1. In a stubble-burner, the combination, with a movable support, of a shield thereon, the front of the shield being open and adapted for the passage thereinto of fuel, and fuel-supports within the shield which are adapted to pick up fuel from the ground, substantially as described.

2. In a stubble-burner, the combination, with a movable support, of a shield thereon, the front of the shield being provided with swinging aprons, and the rear portion with forwardly-extending fuel-supports, said supports being adapted to pick up fuel from the ground, substantially as described.

3. In a stubble-burner, the combination, with runners, of a perforated shield supported thereby, aprons pivotally secured at the front of the shield and forwardly-extending fuel-supporters at the rear, said supports being adapted to pick up fuel from the ground, substantially as described.

4. In a stubble-burner, the combination, with runners, the rear end of each of which is provided with a standard, a cross-piece secured to the tops of said standards, frames secured to the cross-piece, means for connecting the forward ends of the frames with the forward ends of the runners, a perforated shield on said frames, aprons at the front and sides of said shield, and forwardly-extending fuel-supporters within the shield, substantially as described.

5. In a stubble-burner, the combination, with runners, of a standard at the rear end of each runner, an angled cross-piece secured to the tops of said standards, a frame secured at its rear end within the angled portion of the cross-piece above each standard, means for connecting the forward ends of said frames with the forward ends of the runners, a perforated shield on the frames, aprons at the front and sides of said shield and downwardly and forwardly extending forks secured to the under side of said cross-piece, and means for moving said burner forward, substantially as described.

6. In a stubble-burner, the combination, with runners, of a curved leg secured to the forward end of each runner and a standard secured to the rear end, a cross-piece secured to the tops of said standards, frames secured to the cross-piece and to the legs, a shield upon said frames, downwardly and forwardly extending fuel-supporters secured to the under side of the cross-piece, a chain secured to the rear portion of the burner at each end, a cross-bar secured at the forward ends of said chains, and loops for securing the intermediate portions of the chains to the legs.

EDGAR CANNIFF.

Witnesses:
T. S. EWART,
W. S. McLAREN.